(12) United States Patent
Pierce

(10) Patent No.: US 6,905,132 B2
(45) Date of Patent: Jun. 14, 2005

(54) TRAILER TO VEHICLE CONNECTING SYSTEM

(76) Inventor: William H Pierce, 256 Rattan St., Newport, NC (US) 28570

( * ) Notice: Subject to any disclaimer, the term of this patent is extended or adjusted under 35 U.S.C. 154(b) by 0 days.

(21) Appl. No.: 10/726,796

(22) Filed: Dec. 2, 2003

(65) Prior Publication Data

US 2004/0108685 A1 Jun. 10, 2004

Related U.S. Application Data

(63) Continuation-in-part of application No. 10/217,421, filed on Aug. 14, 2002, now abandoned.

(51) Int. Cl.⁷ .................................................. B60D 1/06
(52) U.S. Cl. ...................................... 280/477; 280/511
(58) Field of Search .................................. 280/477, 511

(56) References Cited

U.S. PATENT DOCUMENTS

| | | |
|---|---|---|
| 3,596,925 A | 8/1971 | Ritchie |
| 3,718,317 A | 2/1973 | Hilmer |
| 5,085,408 A | 2/1992 | Norton et al. |
| 6,086,083 A | 7/2000 | Wilks |

*Primary Examiner*—Lesley D. Morris
*Assistant Examiner*—L. Lum
(74) *Attorney, Agent, or Firm*—MacCord Mason PLLC

(57) ABSTRACT

The present invention is a system for hooking a trailer to a towing vehicle. The system has a winch attached to the trailer and a cable that wraps around the ball hitch and is attached to a plate on the trailer. By spacing the cable wide at the plate on the trailer and narrow at the ball of the hitch, the trailer is automatically adjusted to position the tongue of the trailer to center it on the ball hitch.

15 Claims, 6 Drawing Sheets

FIG.(3b)

TRAILER TO VEHICLE CONNECTING SYSTEM

This application is a continuation-in-part of abandoned patent application Ser. No. 10/217,421, filed Aug. 14, 2002.

BACKGROUND OF THE INVENTION (1) Field of the Invention

The present invention relates to a system for connecting a trailer to a vehicle. In particular, the invention relates to a cable and winch system that automatically guides a connector on a trailer to a hitch on a tow vehicle.

(2) Description of the Prior Art

Accessories that assist in the alignment of the mating parts on a trailer and a towing vehicle are known in the prior art. For example, U.S. Pat. No. 3,596,925 to Richie discloses an accessory having a winch attached to the trailer with a cable that wraps around a pulley attached below the ball hitch on the vehicle and which cable also attaches to a frame member on the trailer.

U.S. Pat. No. 3,718,317 to Hilmer discloses an accessory for holding a trailer to a towing vehicle that has a winch attached to the trailer and a cable, which attaches to the towing vehicle.

U.S. Pat. No. 5,085,408 to Norton et al. discloses an accessory for hooking a trailer to a towing vehicle, which has a winch attached to the trailer and a cable, which wraps around a pulley below the winch and is attached to a cross frame member on the trailer.

U.S. Pat. No. 6,086,083 to Wilks discloses a winch attached to a trailer and a cable which wraps around a plurality of pulleys attached to the trailer, through the ball hitch and, attaches to a support for the hall hitch.

In the present invention an accessory for hooking a trailer to a towing vehicle has a winch attached to the trailer and a cable that wraps around the ball hitch and is attached to a side flange on the trailer, all as will be detailed in the specification that follows hereafter.

SUMMARY OF THE INVENTION

The present invention relates to an accessory for hooking a trailer to a towing vehicle that has a winch attached to the trailer and a cable that wraps around the ball hitch and is attached to a side flange on the trailer. By spacing the cable wide at a plate on the trailer and narrow at the ball of the hitch, the trailer is automatically adjusted to position the tongue of the trailer to center it on the ball.

In general, the present invention is a hitch-aligning system that is sold as an aftermarket kit for boat trailers and the like. The hitch-aligning system is attachable to a trailer having a tongue with a forward end that includes a coupling for guiding the coupling to a towing vehicle's trailer hitch. The system is made up of an elongated plate having opposed ends and is transversely attachable to the trailer such that the plate ends are extendable outwardly from opposite sides of the trailer's tongue. The plate can be fastened securely to the trailer tongue using a plurality of U-bolts or by welded joints.

A cable winch is attachable adjacent one plate end and a cable attachment point is located at the other plate end. The cable winch can be of the mechanical or electrical type. The mechanical type winch is operated using a hand crank handle. The cable attachment point can be a hole in the plate or an attached eyelet sized to receive a cable connector such as a cable hook.

The system also includes a cable having one end connected to the winch and a second end that is releasibly attachable to the cable attachment point, whereby the cable attachment point and a cable tension point where the cable departs the winch are equidistantly separated from the trailer's centerline or tongue by a distance that is at least a multiple larger than the trailer coupling to cause a triangulating action that automatically aligns the trailer coupling with the towing vehicle's trailer hitch, whenever the cable is under tension between the winch and trailer hitch and between the trailer hitch and cable attachment point.

The hitch aligning system can further include a pulley rotatably coupled to a pulley housing having a releasable hitch attachment member for connecting the cable to the towing vehicle's hitch. The pulley is used to reduce the friction that would normally be encountered if the cable was simply looped around the neck of a towing vehicle's ball hitch. Preferably, the releasable hitch attachment member is a simple hook that can be hooked around the neck of a towing vehicle's ball hitch. In this case, the cable loops over the pulley instead of the ball neck of the trailer hitch. Other releasable hitch members such as a ring or static cable loop could also be used.

The invention can also be factory installed on a manufactured boat trailer. In this case, the invention is a trailer that is automatically guidable to a towing vehicle. The trailer is made up of a trailer frame with a longitudinal centerline. The frame includes a rearward section with wheels and a forward section having a forward extending tongue ending with a trailer hitch coupling. The tongue and coupling are aligned with the trailer's longitudinal centerline.

An elongated plate having opposed ends is secured transversely onto the trailer by at least one metallurgic weld. Alternately, as with the kit the plate could be attached using a plurality of U-bolts. In either case, the plate ends extend outwardly from opposite sides of the tongue.

A cable winch is attachable adjacent one plate end and a cable attachment point is included with the other plate end. The trailer also includes a cable having one end connected to the winch and a second end that is releasibly attachable to the cable attachment point whereby, the cable attachment point and a cable tension point where the cable departs the winch are equidistantly separated from the trailer's centerline by a distance that is at least a multiple larger than the trailer coupling to cause a triangulating action that automatically aligns the trailer's coupling with the towing vehicle's trailer hitch whenever the cable is under tension between the winch and trailer hitch, and the trailer hitch and the cable attachment point of the plate.

In operation, a towing vehicle is maneuvered towards a trailer to be hitched and is parked from the trailer within half the length of the trailer's cable. The cable is unwound from the winch and the connecting end of the cable is secured to the cable attachment point on the trailer's plate. Preferably, the pulley with releasable hitch attachment member is already engaged with the cable.

At this point the releasable hitch member is connected to the hitch of the towing vehicle and the cable is put under tension by operating the winch to wind in a portion of the cable. Once the cable is under tension the cable is continually wound onto the winch resulting in the pulley of the trailer towards the parked towing vehicle. Specifically, the winding of the cable onto the winch pulls the trailer's coupling directly towards the trailer hitch of the towing vehicle. Since the cable is connected at two points on the trailer that are transversely equidistant to the trailer tongue, the trailer connector on the end of the tongue is automatically pulled directly to the towing vehicle's trailer hitch whenever the apex of the cable is attached to the vehicle's trailer hitch.

Once the trailer coupling is drawn as close as possible to the towing vehicle's trailer hitch using the pulley with the releasable hitch attachment member, the winding of the cable is temporarily halted and some of the tension is released by unwinding a short length of cable from the winch. This is done to remove the releasable hitch attachment member from the towing vehicle's hitch. Since the coupling is above the hitch at this point, an individual can pull the trailer and coupling up to the connecting point to complete the hitching process.

Alternately the cable can be looped over the towing vehicle's hitch and a portion of the cable is rewound onto the winch until the coupling of the trailer is in alignment with the hitch of the towing vehicle. Once coupled, the tension on the cable can be released so that the cable loop can be withdrawn from the towing vehicle's hitch. The cable is then wound back onto the winch for storage where the cable will remain until it is needed to guide and connect the trailer at some future time.

It is the primary object of the present invention to provide for a new and improved system for securing a trailer to a towing vehicle.

Another object is to provide for a new and improved system for securing a trailer to a towing vehicle wherein one person may operate the system.

These and other advantages of the present invention will become apparent to readers from a consideration of the ensuing description and the accompanying drawings.

BRIEF DESCRIPTION OF THE DRAWINGS

FIG. 3(b) is a perspective view of the FIG. 3(a) mount taken from the front.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
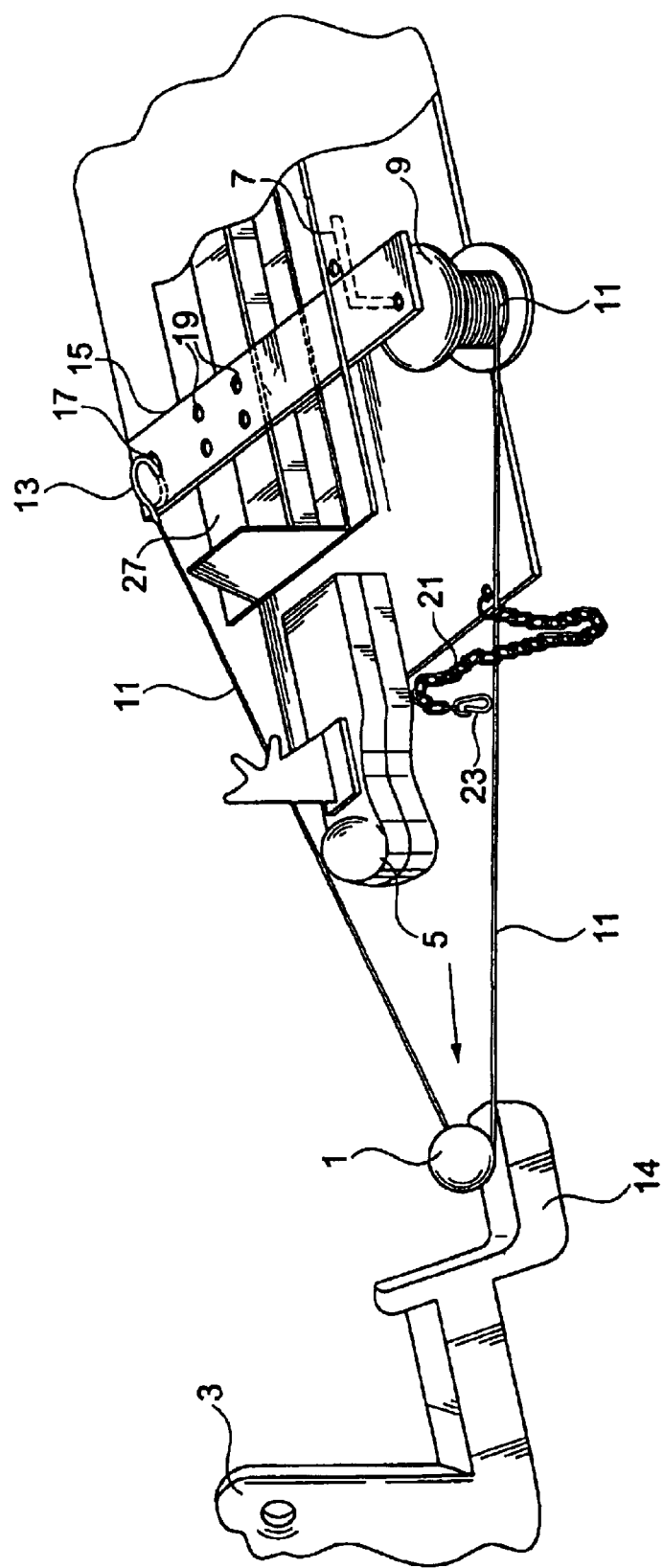
FIG. 1 is a perspective view of the present invention before the towing vehicle and trailer are mounted.

FIG. 1 is a perspective view of the present invention before a ball hitch 1 is affixed to a towing vehicle 3. A trailer having a coupling 5 mounted to it, which will mate with the ball 1 in the conventional manner. Only the mating ends of the towing vehicle and trailer are shown in this view. The conventional ball hitch 1 is fixed to the trailing end of the vehicle and the conventional mating coupling 5, which is hollow and spherical in shape to fit over the hitch 1, is fixed to an extension of the trailer. Also fixed to the trailer is a conventional hand operated winch 9. A removable handle 7 (shown in dotted lines) is used to rotate the winch about a vertical axis. Wound around the winch is a steel cable 11. When extended, the cable 11 extends from the winch 9 to the base of the hitch and around the hitch where it terminates at a cable hook 13 on the opposite side of the trailer.

The upper portion of the hitch 1 has a larger diameter than the lower base of the hitch 1 that the base sits on, and is connected to, an upward extension to the hitch extension 14. At the meeting of the hitch lower base and the upward portion of extension 14, the cable 11 goes around the intersection in what may be considered a retaining groove for the cable 11. This retaining groove is joined to the base of the hitch 1.

A plate 15, made of one piece, extends laterally across the frame of the trailer. Mounted on one side and beneath the plate 15 is the hand-operated winch 9. On the other side of the plate, opposite the winch, is a hole 17 or, alternately, an eyehook (not shown). The snap hook 13 on the end of cable 11 engages hole 17. The plate 15 is firmly mounted over the existing frame of the trailer by bolts 19. The plate 15 could also be welded to the trailer frame. At the lower end of the trailer is a conventional safety chain 21 fixed to the trailer at one end. A hook 23, on the end of the chain 21, can be attached to the towing vehicle with the chain extending between the trailer and the vehicle.

Figure 2:
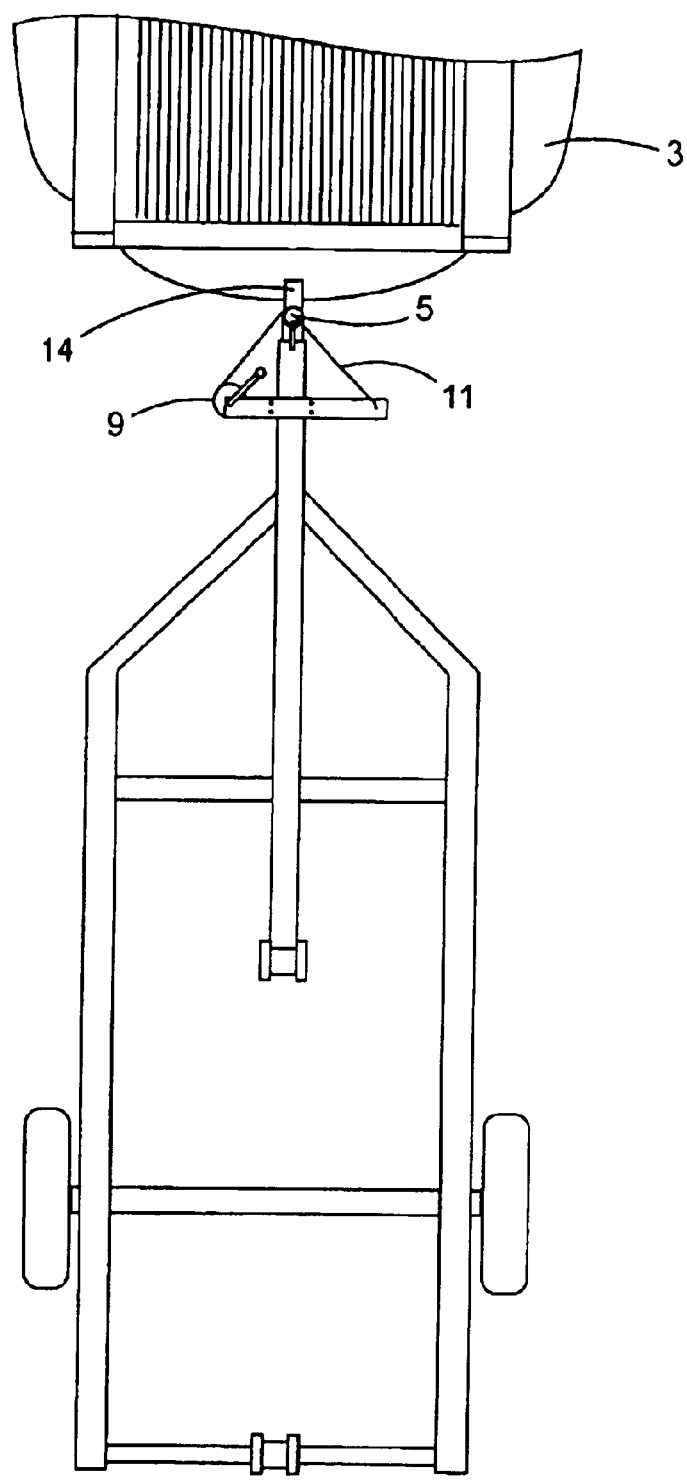
FIG. 2 is a top view of the present invention just after the trailer coupling is mounted on the ball hitch of the towing vehicle.

FIG. 2 is a top view of the present invention just after the coupling 5 is mounted onto the ball hitch 1 of the towing vehicle 3. The cable 11 from the winch 9 is more clearly shown in this view. Cable 11 extends around a bottom portion of the ball 1 in a retaining groove between where the upper portion of the hitch joins a lower upstanding supporting surface on the extension 14. The groove formed where the members 1 (not visible) and the supporting surface of extention 14 meet is circular and insures that the cable 11 will not slip out of place as more tension is placed on the cable to draw the trailer closer to the towing vehicle 3. The other, or free end of the cable, with hook 13 is secured into hole in the plate 15.

Figure 3A:
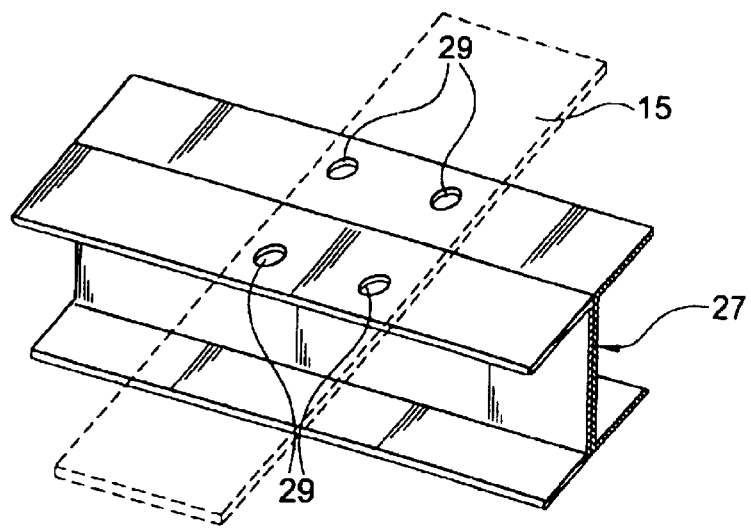
FIG. 3(a) is a perspective view of a universal mount that can be used with the present invention.

FIG. 3(a) is a partial perspective view of a universal trailer mount 27 that can be used with the present invention. The conventional mount 27 is typically found in boat trailers and forms the leading end where the trailer is mounted to the towing vehicle. Plate 16, of FIGS. 1 and 2, here shown in dotted line format, is secured to the mount 27 by bolts 19, passing through holes 29 into plate 15.

FIG. 3(b) is a perspective view of the FIG. 3(a) mount 27 taken from the front. The trailer mount 27 is formed of two substantially identical C-channels making up I-beam shaped frame members 31 joined along their lengths. The holes 29, disclosed with respect to FIG. 3(a), would go through the upper flange section with the retaining bolts 19 passing through plate 15, through mount 27 and secured with retaining nuts (not shown).

Figure 4:
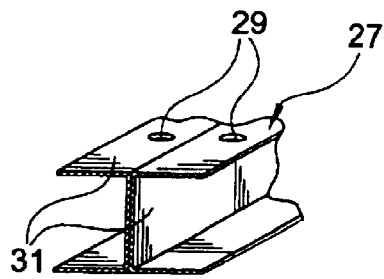
FIG. 4 is a perspective view of an alternate type of universal mount for the present invention that can be used with typical pop-up and utility trailer mounts.
Figure 4:
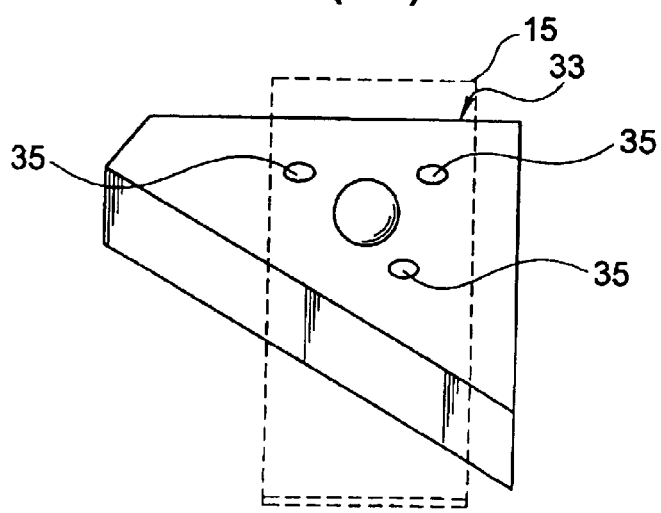

FIG. 4 is a perspective view of another type of universal trailer mount 33 that can be used with the present invention. This type of mount 33 is normally associated with a camper trailer. Three holes 35 are formed in the generally triangular shaped mount 33 permitting bolts, or other threaded fasteners, to be inserted through them and secured by retaining nuts to hold mount 33 to the plate 15, here shown in dotted line format.

Figure 5:
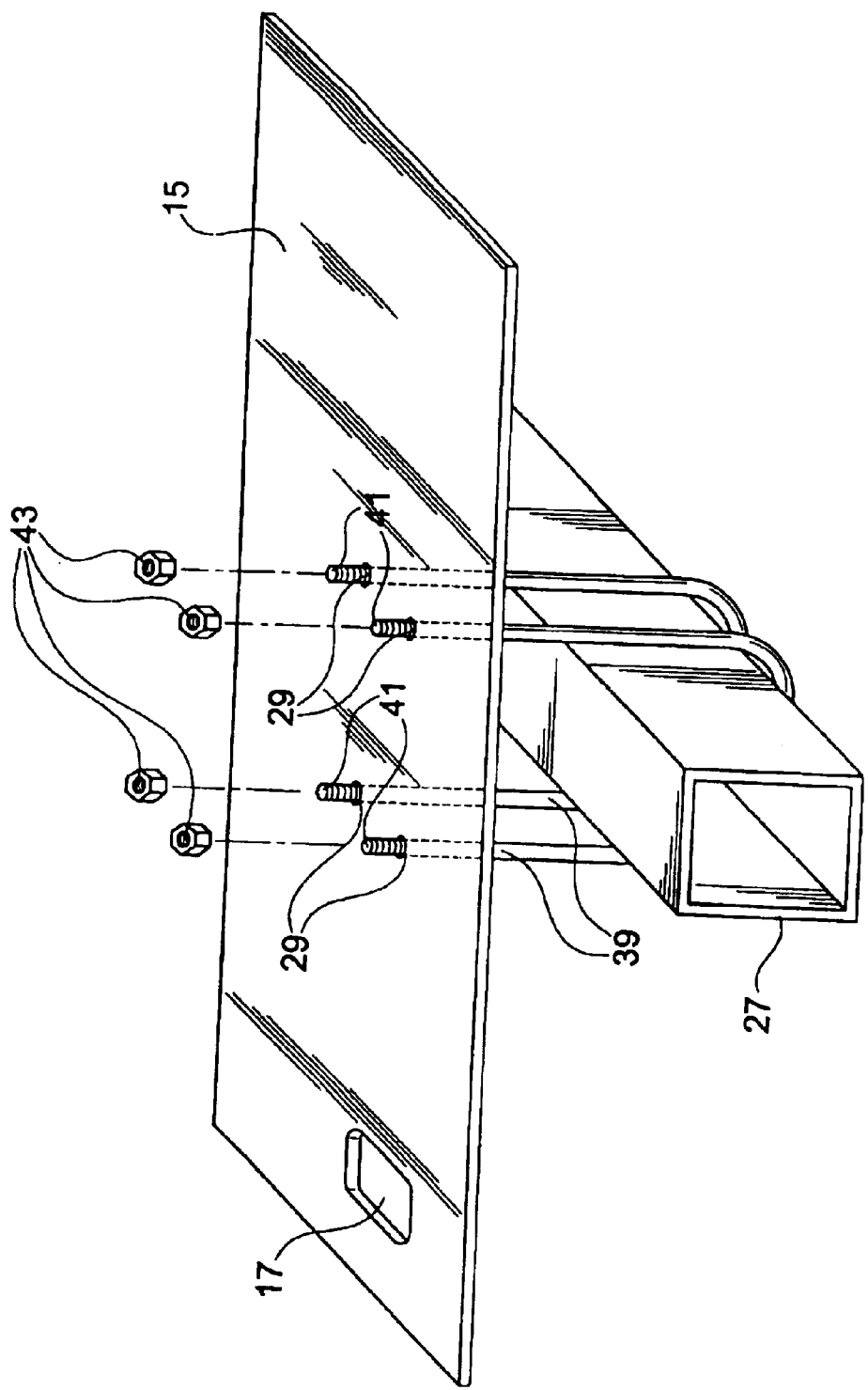
FIG. 5 is a perspective view of the mounting plate fastened to a rectangular trailer frame member.

FIG. 5 is a perspective view of another method of attaching plate 15 to a trailer. Two U-shaped bolts 39 extend under the member 37 and pass through holes 29 and plate 15. Bolts 39 have threaded free ends 41, which fit through holes 29. Nuts 43 engage the ends 41 to hold plate 15 to the frame 37.

It should be clear that the particular type of winch 9 that can be used may be a simple hand operated winch, a compound winch, or an electrical motor operated winch, depending on the particular load (trailer) to be pulled toward the towing vehicle. The cable 11 may be made of any strong material that can perform safely, such as a steel cable, a stainless steel cable, or plastic coated cable. Any type of trailer and towing vehicle combination with the requisite features may employ the principles of this invention.

In use, a single user would stop the towing vehicle approximately 3 or 4 feet from the trailer that is to be towed. Using such a stopping distance insures the trailer and towing vehicle will not hit. This spacing allows for some manipulation by the user of the trailer extension to insure its retaining coupling 5 will fit directly over the spherical shaped hitch 1. If a lesser distance were used, there is a chance that the trailer would be out of alignment with the towing vehicle by a small amount. Next, the winch 9 is moved to an opened position allowing the cable 11 to be extended from the winch. The cable is placed around the base of the hitch 1. The snap hook 13 is opened and snapped to a closed position on the hole or eye hook on the opposite side of plate 15 from the winch. If desired, the hole 17 (shown in FIG. 5) can be eliminated, and the hook 13 could simply be mounted in an eyehook fixed to the plate 15 at the same location.

Next, after locking the cable free end to the plate 15, the winch is moved to a closed or pulling position. The winch is then activated to move the cable, which is then made taut. The coupling 5, attached to the trailer, is pulled by the cable towards the vehicle and, due to the triangular configuration of the connecting, taut cable 11, is guided into position directly over the ball 1 and then lowered down on the ball. The coupling may then be fastened onto the hitch in the usual manner. The safety hook 23 on the trailer is also fixed to a hole in the hitch. Following this, some slack is allowed in the cable 11 and the hook 13 is removed from the frame hole (or eye hook) and the cable 11 is rewound on the winch. The hook 13 can then be fixed to a hole in the frame and the winch is placed in a locked position.

By providing for a triangular configuration of the taut cable 11 relative to the hitch 1, the position of the trailer will automatically be adjusted to be positioned over the coupling 5. The arrangement of the cable from the winch to the ball 1 results in ½ the load on the cable relative to a single cable directly connected to the towing vehicle. This also provides for a mechanical advantage of 2 to 1.

Figure 6:
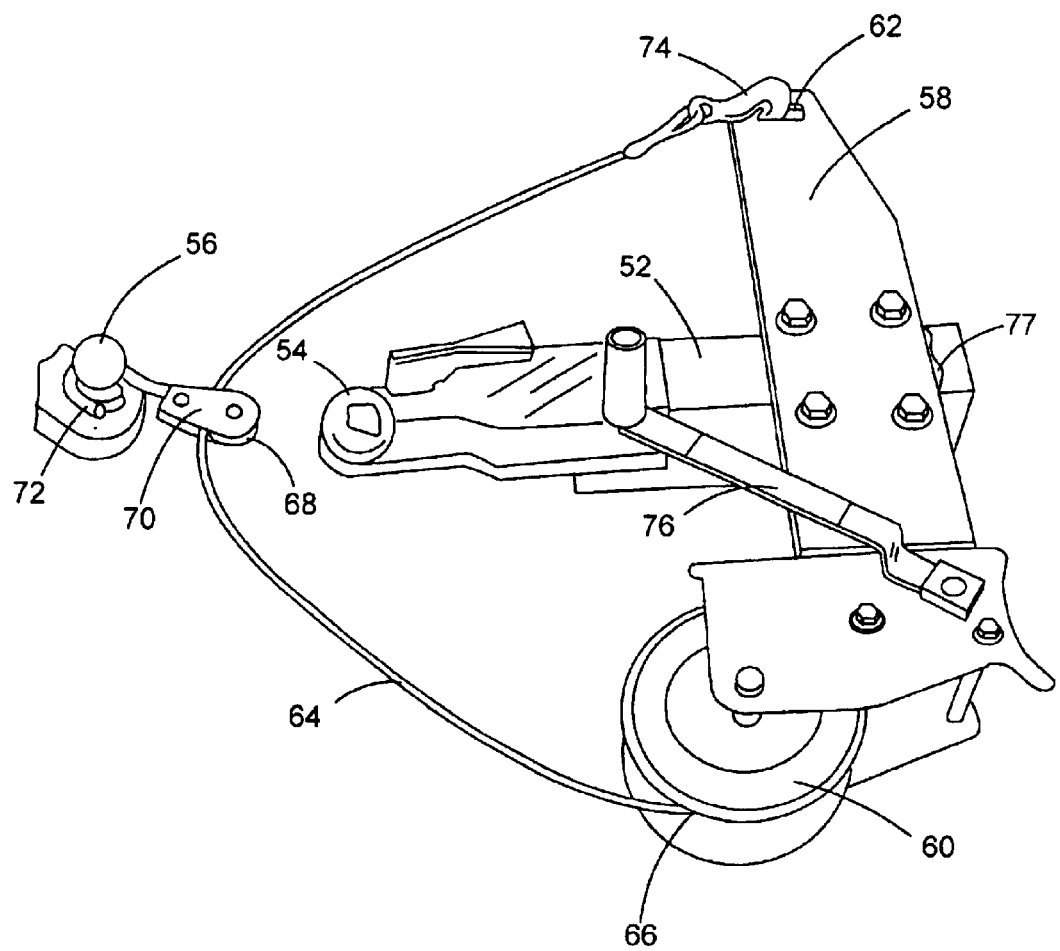
FIG. 6 is a perspective view of an alternate embodiment of the hitch alignment system of the present invention.
Figure 7:
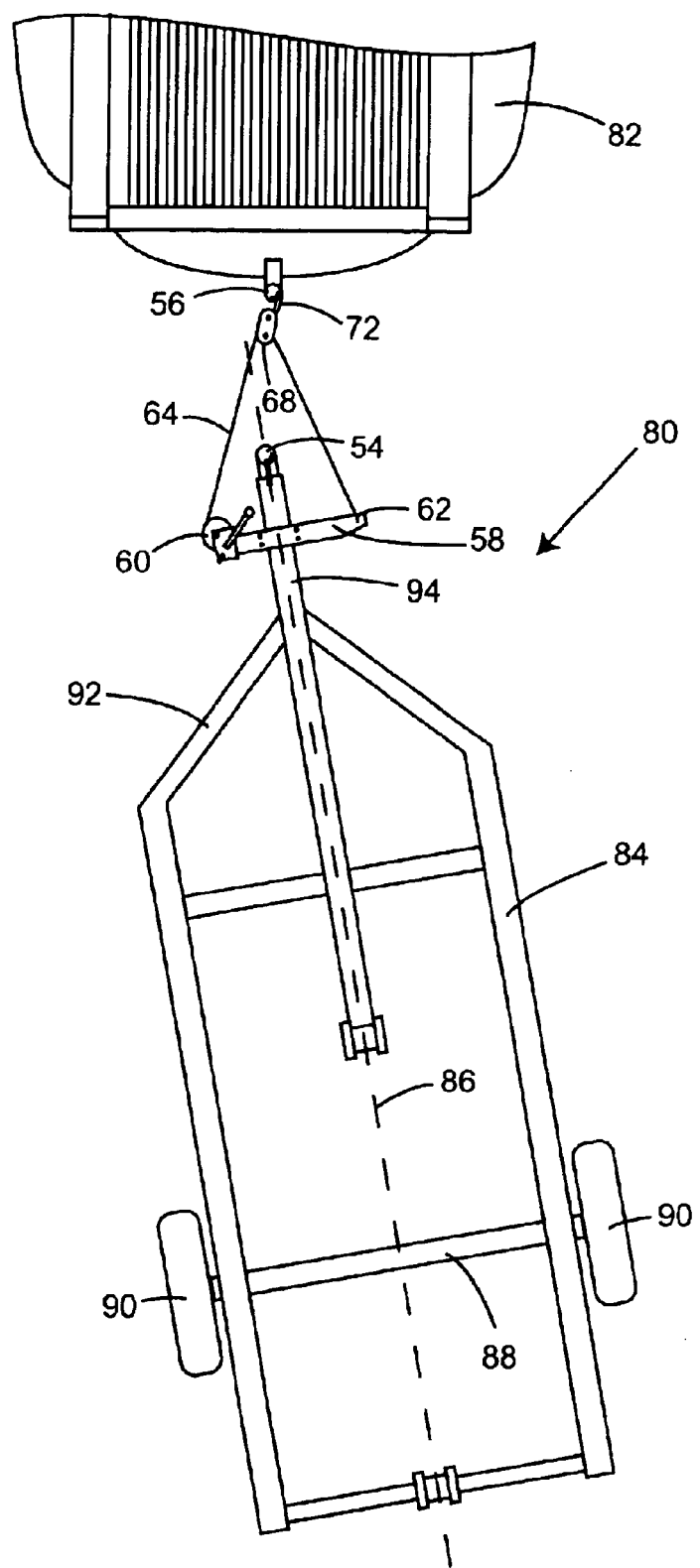
FIG. 7 is a top view of a trailer being guided by the hitch alignment system of the present invention.

FIGS. 6 and 7 show an alternate embodiment of the hitch-aligning system of the present invention. The hitch-aligning system, generally 50, is attachable to a trailer tongue 52 with a forward end that includes a coupling 54 for guiding said coupling to a towing vehicle's trailer hitch 56. The hitch-aligning system comprises:

a) an elongated plate 58 having opposed ends, the plate being transversely attachable to trailer tongue 52 such that the plate ends are extendable outwardly from opposite sides of tongue 52;

b) a cable winch 60 is attachable adjacent one plate end and a cable attachment point 62 is located on the other plate end;

c) a cable 64 having one end connected to said winch and a second end that is releasably attachable to cable attachment point 62, whereby cable attachment point 62 and a cable tension point 66 where the cable departs winch 60 are equidistantly separated from trailer tongue 52 by a distance that is at least a multiple larger than trailer coupling 54; and d) a pulley 68 rotatably coupled to a pulley housing 70 that includes a releasable hitch attachment member 72 for connecting cable 64 to the towing vehicle's hitch 56 to cause a triangulating action that automatically aligns trailer coupling 54 with the towing vehicle's trailer hitch 56, whenever cable 64 is under tension between winch 60 and trailer hitch 56 and between trailer hitch 56 and cable attachment point 62. The second end of cable 64 can be terminated with a hook 74 for making the second end of cable 60 releasably attachable to cable attachment point 62. A hand crank handle 76 is used to wind winch 60. FIG. 6 also shows at least one metallurgical weld 77 that can optionally be used to secure plate 58 to tongue 52.

FIG. 7 shows the invention in the form of a manufactured trailer 80 that is automatically guidable to a towing vehicle 82. Trailer 80 comprises a trailer frame 84 with a longitudinal centerline 86. The frame includes a rearward section 88 with wheels 90 and a forward section 92 that includes a forward extendable tongue 94 ending with a trailer hitch coupling 96. Tongue 94 and coupling 96 are aligned with longitudinal centerline 86. In operation, towing vehicle 82 is maneuvered towards a trailer to be hitched and is parked from trailer 80 within half the length of cable 64. Cable 64 is unwound from winch 60 and the connecting end of cable 64 is secured to cable attachment point 62 on plate 58. Cable 64 is engaged with pulley 68 and releasable hitch member 72 is connected to the hitch 56. Cable 64 is put under tension by operating winch 60 to wind in a portion of cable 64. Once cable 64 is under tension, cable 64 is continually wound onto winch 60 resulting in the pulling of the trailer 80 towards towing vehicle 82. Specifically, the winding of cable 64 onto winch 60 pulls coupling 54 directly towards trailer hitch 56 even if the centerline 86 of trailer 80 is angularly offset from hitch 56 as shown in FIG. 7.

Certain modifications and improvements will occur to those skilled in the art upon a reading of the foregoing description. It should be understood that all such modifications and improvements have been deleted for the sake of conciseness and readability but are properly within the scope of the following claims.

What is claimed is:

1. A hitch-aligning system attachable to a trailer having a tongue with a forward end that includes a coupling comprising a ball socket for guiding said coupling to a towing vehicle's trailer hitch, said hitch-aligning system comprising:

a) an elongated plate having opposed ends, said plate being transversely attachable to said trailer such that said plate ends are extendable outwardly from opposite sides of said tongue;

b) a cable winch attachable adjacent one plate end and a cable attachment point on the other plate end; and c) a cable having one end connected to said winch and a second end that is releasably attachable to said cable attachment point, whereby said cable attachment point and a cable tension point where the cable departs said winch are equidistantly separated from the trailer's centerline by a distance that is at least a multiple larger than said ball socket to cause a triangulating action that automatically aligns said trailer coupling with the towing vehicle's trailer hitch, whenever said cable is under tension between said winch and trailer hitch and between said trailer hitch and said cable attachment point.

2. The hitch aligning system of claim 1, further including a pulley rotatably coupled to a pulley housing that includes a releasable hitch attachment member for connecting said cable to the towing vehicle's hitch.

3. The hitch aligning system of claim 2, wherein said releasable hitch attachment member is a hook sized to fit around a neck of a ball type hitch on the towing vehicle.

4. The hitch aligning system of claim 1, wherein a plurality of U-bolts secure said plate to said trailer tongue.

5. The hitch aligning system of claim 1, wherein said cable second end includes a cable hook for securing said cable second end to said plate's cable attachment point.

6. The hitch aligning system of claim 5, wherein said cable attachment point is a hole sized to accommodate said cable hook.

7. A trailer that is automatically guidable to a towing vehicle, said trailer comprising:
   a) a trailer frame with a longitudinal centerline, said frame having a rearward section with wheels and a forward section that includes a forward extendable tongue ending with a trailer hitch coupling comprising a ball socket, said tongue and coupling being aligned with said longitudinal centerline;
   b) an elongated plate having opposed ends, said plate being transversely attachable to said trailer such that said plate ends are extendable outwardly from opposite sides of said tongue;
   c) a cable winch attachable adjacent one plate end and a cable attachment point on the other plate end;
   d) a cable having one end connected to said winch and a second end that is releasibly attachable to said cable attachment point, whereby said cable attachment point and a cable tension point where the cable departs said winch are equidistantly separated from the trailer's centerline by a distance that is at least a multiple larger than said ball socket to cause a triangulating action that automatically aligns said trailer coupling with the towing vehicle's trailer hitch, whenever said cable is under tension between said winch and trailer hitch and between said trailer hitch and said cable attachment point; and
   e) a pulley rotatably coupled to a pulley housing that includes a hook sized to fit around a neck of a ball type hitch on the towing vehicle for connecting said cable to the towing vehicle's hitch.

8. The trailer of claim 7, wherein said cable second end includes an attached cable hook for securing said cable second end to said plate's cable attachment point.

9. The trailer of claim 7, wherein said plate is attached to said trailer tongue by at least one metallurgic weld.

10. A hitch-aligning system attachable to a trailer having a tongue with a forward end that includes a coupling comprising a ball socket for guiding said coupling to a towing vehicle's trailer hitch, said hitch-aligning system comprising:
    a) an elongated plate having opposed ends, said plate being transversely attachable to said trailer such that said plate ends are extendable outwardly from opposite sides of said tongue;
    b) a cable winch attachable adjacent one plate end and a cable attachment point on the other plate end;
    c) a cable having one end connected to said winch and a second end that is releasibly attachable to said cable attachment point, whereby said cable attachment point and a cable tension point where the cable departs said winch are equidistantly separated from the trailer's centerline by a distance that is at least a multiple larger than said trailer coupling; and
    d) a pulley rotatably coupled to a pulley housing that includes a releasable hitch attachment member for connecting said cable to the towing vehicle's hitch to cause a triangulating action that automatically aligns said, ball socket with the towing vehicle's trailer hitch, whenever said cable is under tension between said winch and trailer hitch and between said trailer hitch and said cable attachment point; and
    e) a pulley rotatably coupled to a pulley housing that includes a hook sized to fit around a neck of a ball type hitch on the towing vehicle for connecting said cable to the towing vehicle's hitch.

11. The hitch aligning system of claim 10, wherein a plurality of U-bolts secure said plate to said trailer tongue.

12. The trailer of claim 10, wherein said plate is attached to said trailer tongue by at least one metallurgic weld.

13. The hitch aligning system of claim 10, wherein said cable second end includes a cable hook for securing said cable second end to said plate's cable attachment point.

14. The hitch aligning system of claim 10, wherein said cable attachment point is a hole sized to accommodate said cable hook.

15. The hitch aligning system of claim 10, wherein said cable winch is manually operated by way of a hand crank handle.

\* \* \* \* \*